3,365,443
PREPARATION OF LACTAMS FROM CYCLO-ALIPHATIC KETOXIMES

Johan W. Garritsen, Geleen, Netherlands, assignor to Stamicarbon N.V., Heerlen, Netherlands
No Drawing. Filed Apr. 19, 1965, Ser. No. 449,301
Claims priority, application Netherlands, Apr. 22, 1964, 64—4,371
13 Claims. (Cl. 260—239.3)

The present invention relates to the preparation of lactams from the corresponding cyclo-aliphatic ketoximes by the so-called Beckmann rearrangement.

This rearrangement, of which the preparation of ε-caprolactam is the best-known example because of its application on an industrial scale, is carried out in practice using concentrated sulfuric acid and usually with the use of oleum. When the rearrangement product is neutralized, large amounts of alkali sulfate or ammonium sulfate are then obtained as impure by-products, which have to be carefully purified before they are of any value.

The formation of the sulfate by-products is thus a disadvantage and desirably would be eliminated by carrying out the Beckmann rearrangement without the use of sulfuric acid.

It is, therefore, the principal object of the present invention to provide a new process for the production of lactams from the corresponding cyclo-aliphatic ketoximes without the use of sulfuric acid.

Other objects will be apparent from the following description and appended claims.

It has now been found that lactams can be obtained from the corresponding cyclo-aliphatic ketoximes if the oxime is brought into contact with an imidochloride or a hydrochloride salt thereof. In this manner the "Beckmann" rearrangement can take place without using concentrated sulfuric acid.

In general, this invention may be used with cycloalkanone oximes, and the corresponding lactams will be formed as in the Beckmann rearrangement. Suitable common oximes of presently greatest importance are the oximes of cyclopentanone, cyclohexanone, cycloheptanone, cyclooctanone, cyclodododekanone, etc. (e.g. cycloalkanone oximes having from 4 to 14 carbon atoms). Generally, as stated, the invention is applicable to the oximes of any cyclic ketones which will undergo a sulfuric acid Beckmann rearrangement.

The imidochlorides used in the present invention have the general formula $R_1$—$C(Cl)$=$N$—$R_2$, wherein $R_1$ represents a member selected from the class consisting of a hydrogen atom, an alkyl group containing from 1 to about 18 carbon atoms, an alkyl group having a substituent of the formula —$C(Cl)$=$N$—$R_2$, and a monocyclic carbocyclic aryl group, a monocyclic 5 to 6 membered cycloalkyl group containing from 5 to about 9 carbon atoms, $R_2$ represents a member selected from the class consisting of a hydrogen atom, an alkyl group containing from 1 to about 18 carbon atoms, a monocyclic carbocyclic aryl group, and a monocyclic 5 to 6 membered cycloalkyl group containing from 5 to about 9 carbon atoms, and $R_1$ and $R_2$ may together represent a chain of methylene radicals necessary to complete a ring containing from 4 to about 12 carbon atoms. These compounds are readily available. They can also easily be produced by well known reactions: for example, by the reaction of acid amides with phosgene or by the reaction of nitriles with hydrogen cholride.

Examples of imidochlorides which can be used in the present invention are: acetimidochloride, benzimidochloride, adipimidochloride, N-propyl acetimidochloride, N-butyl benzimidochloride, N-phenyl hexahydrobenzimidochloride, 2-chloroazacycloheptene-1.

These imidochlorides may also be used in the form of their hydrochloride salts.

The relative amount of imidochloride to be used can be varied within wide limits. It is preferred to use about an equimolecular amount of imidochloride, or an excess, with respect to the amount of oxime. If smaller amounts are used, the reaction time would be longer and the rearrangement would not be complete.

The rearrangement according to the present invention may be carried out in various ways. If the reaction is to be carried out in the vapor phase, the oxime may be evaporated and the vapor passed through solid or liquid imidochloride. As another example, molten oxime may be brought into contact with the imidochloride.

The rearrangement is exothermic, so that there will be a rise in temperature during the reaction. For this reason, the rearrangement is preferably carried out in the liquid phase, with the oxime dissolved in a solvent and mixed with a solution of the imidochloride. In this process, the temperature can be easily maintained at the desired value.

The reaction temperature may be varied within wide limits and is preferably kept between 30 and 150° C., at which temperature level the reaction proceeds smoothly. It is also possible to start the reaction at a lower temperature, e.g., 10–20° C., and to allow the temperature to rise as a result of the exothermic nature of the rearrangement.

The reaction pressure may be varied within wide limits, however, it is not necessary to apply a subatmospheric or superatmospheric pressure so that a simple apparatus may be used.

Examples of solvents suitable for use in the present invention include alkanes such as heptane, chlorinated alkanes such as chloroform and isopropyl chloride, nitroalkanes such as nitromethane and nitropropane, cycloalkanes such as cyclohexane, nitrocycloalkanes such as nitrocyclohexane, monocyclic carbocyclic aryl compounds such as benzene, chlorobenzene and nitrobenzene, ethers such as diethyl ether and dioxane, and nitriles such as acetonitrile, benzonitrile and adiponitrile.

It is not necessary to use the same solvent for the oxime and the imidochloride. Mixtures of solvents may also be used.

The amount of solvent to be used may be varied within wide limits, depending on the nature of the particular oxime and imidochloride to be dissolved. In general, it is found that from about 10 to 1000 percent by weight, of the solvent, with respect to the amount of oxime, may be used.

The resulting lactam may be obtained from the rearrangement mixture in a simple way, e.g., by evaporating the solvent and separating the lactam by crystallization. In this manner, the imidochloride used can be recovered and reused.

*Example I*

In a 0.5-litre reaction vessel provided with a reflux cooler 11 g. of cyclohexanone oxime and 20 g. of N-butyl benzimidochloride are dissolved in 200 ml. of diethyl ether at a temperature of 10° C. The rearrangement proceeds spontaneously and raises the temperature until the solution boils.

Boiling is continued for 0.5 hour, and then the resulting caprolactam is separated off by filtration. The output is 10 g. of crude caprolactam (lactam content 88%; efficiency 80%).

*Example II*

In a 1-litre reaction vessel provided with a reflux cooler 28 g. of cyclohexanone oxime is dissolved in 150 ml.

of diethyl ether, after which a solution of 55 g. of N-phenyl hexahydrobenzimidochloride in 200 ml. of diethyl ether is added at a temperature of 10–15° C. The rearrangement sets in spontaneously and raises the temperature until the solution boils.

After the solution has boiled for 0.5 hour, the resulting caprolactam is separated by filtration. The output is 26.5 g. of crude lactam (caprolactam content 90%; efficiency 85%).

The resulting mother liquor is reused to rearrange a fresh amount of oxime.

*Example III*

In a 1-litre reaction vessel provided with a stirrer and a reflux cooler 70.5 g. of fused cyclooctanone oxime is added with simultaneous stirring to a solution of 60 g. of acetimidochloride-hydrochloride in 150 ml. of acetonitrile at a temperature of 45–50° C. After a temperature of 75–80° C. is reached, the stirring is continued for 0.5 hour.

The solvent is then removed by distillation and the lactam is recovered from the residue by extraction with chloroform. The obtained solution is washed until free of acid and subsequently the chloroform is evaporated and the lactam is distilled. In this manner 65.5 g. of caprylolactam is obtained (lactam content 98%; efficiency 91%).

*Example IV*

In a 1-litre reaction vessel provided with a stirrer and a reflux cooler a mixture of 98.5 g. of cyclododecanone oxime, 60 g. of acetimidochloride-hydrochloride and 250 ml. of acetonitrile is heated at 75–80° C., while stirring during 10 minutes. Subsequently acetimidochloride and acetonitrile are removed by distillation.

The residue is washed with water and recrystallised with the aid of cyclohexane.

The output is 95 g. of laurinolactam (lactam content 99.5%, efficiency 96%).

*Example V*

In a 0.5-litre reaction vessel provided with a stirrer and a reflux cooler a mixture of 39.4 of cyclododecanone oxime, 35 g. of benzimidochloride and 150 ml. of benzonitrile is heated. When the temperature has reached about 90° C. the rearrangement reaction starts. The temperature is further increased to 120° C. and is maintained at 115–120° C. during 10 minutes.

Subsequently benzimidochloride and benzonitrile are removed by distillation. The remaining laurinolactam is washed with cyclohexane.

In this manner 39.2 g. of laurinolactam is obtained (lactam content 97.5%, efficiency 97%).

The invention has been described in detail with particular reference to the preferred embodiments thereof, but it will be understood that variations and modifications may be made therein within the spirit and scope of the invention.

I claim:
1. A process for preparing lactams comprising contacting a cycloalkanone oxime with an imidochloride.
2. A process of claim 1 wherein the imidochloride is in the form of its hydrochloride.
3. A process for preparing lactams comprising contacting a cycloalkanone oxime with an imidochloride having the general formula $R_1-C(Cl)=N-R_2$, wherein $R_1$ represents a member selected from the class consisting of a hydrogen atom, an alkyl group containing from 1 to about 18 carbon atoms, an alkyl group having a substituent of the formula $-C(Cl)=N-R_2$, and a monocyclic carbocyclic aryl group, a monocyclic 5 to 6 membered cycloalkyl group containing from 5 to about 9 carbon atoms, $R_2$ represents a member selected from the class consisting of a hydrogen atom, an alkyl group containing from 1 to about 18 carbon atoms, a monocyclic carbocyclic aryl group, and a monocyclic 5 to 6 membered cycloalkyl group containing from 5 to about 9 carbon atoms, and $R_1$ and $R_2$ may together represent a chain of methylene radicals necessary to complete a ring containing from 4 to about 12 carbon atoms.
4. A process of claim 3 wherein the imidochloride is in the form of its hydrochloride.
5. A process for preparing lactams comprising mixing a cycloalkanone oxime with an imidochloride in the presence of a solvent.
6. A process of claim 5 wherein the reaction is carried out at a temperature of 30° to 150° C.
7. A process for preparing ε-caprolactam comprising contacting cyclohexanone oxime with an imidochloride.
8. The process of claim 7 wherein the reaction is carried out in the presence of a solvent.
9. A process for preparing ε-caprolactam comprising contacting cyclohexanone with an imidochloride.
10. A process of claim 9 wherein the reaction is carried out in the presence of a solvent.
11. A process for preparing ω-caprylolactam comprising contacting cyclooctanone oxime with an imidochloride.
12. A process for preparing ω-laurinolactam comprising contacting cyclododecanone oxime with an imidochloride.
13. A process for preparing ω-laurinolactam comprising contacting cyclododecanone oxime with an imidochloride-hydrochloride.

References Cited

UNITED STATES PATENTS 2,221,369  11/1940  Cass _____ 260—239.3
2,234,566  3/1941  Lazier et al. _____ 260—239.3

JOHN D. RANDOLPH, *Primary Examiner.*

WALTER A. MODANCE, *Examiner.*

R. BOND, *Assistant Examiner.*